Patented Nov. 12, 1940

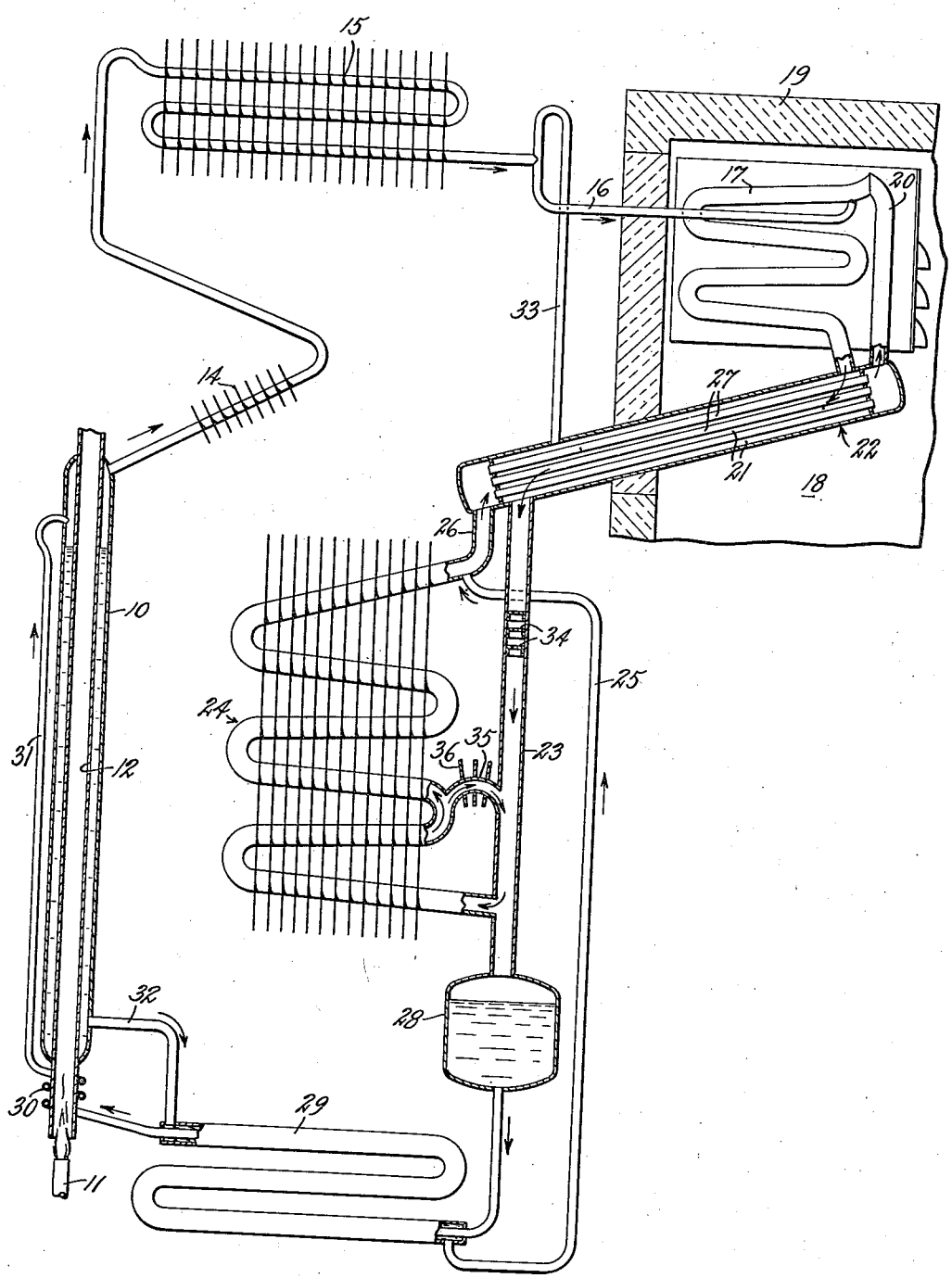

2,221,145

UNITED STATES PATENT OFFICE 2,221,145

REFRIGERATION

Alvar Lenning, Stockholm, Sweden, assignor, by mesne assignments, to Servel, Inc., New York, N. Y., a corporation of Delaware Application March 17, 1937, Serial No. 131,346
In Germany March 20, 1936

7 Claims. (Cl. 62—119.5)

My invention relates to refrigeration, and more particularly to an absorption type system employing evaporation of refrigerant fluid in the presence of an inert auxiliary fluid.

It is an object of my invention to provide an improvement in fluid circulation in a refrigeration system of this type whereby refrigerant vapor is more effectively absorbed into an absorbent. I accomplish this by causing auxiliary fluid containing refrigerant vapor to flow several times through a place of absorption before proceeding to a place of evaporation.

The above and other objects and advantages of my invention will become apparent from the following description and accompanying drawing, of which the single figure more or less diagrammatically illustrates a refrigeration system embodying the invention.

Referring to the drawing, I have shown the present improvement embodied in a refrigeration system of a uniform pressure absorption type containing a pressure equalizing gas or auxiliary fluid. The system includes a generator 10 containing a refrigerant, such as ammonia, in solution in a body of absorption liquid, such as water. The generator 10 may be heated in any suitable manner, as by a gas burner 11, which is adapted to project its flame into the lower end of a flue 12. The heat applied to the generator 10 and its contents expels the ammonia out of solution, and the ammonia vapor flows upward through an air-cooled rectifier 14 in which accompanying water vapor is condensed and drains back to the generator 10. The expelled ammonia vapor is liquefied in an air-cooled condenser 15, and flows therefrom through a conduit 16 into the upper end of an evaporator or cooling element 17. The evaporator 17 is disposed in an enclosed space 18 which may form a food storage compartment of a thermally insulated refrigerator cabinet 19.

An auxiliary agent or inert gas, such as hydrogen, enters the upper end of the evaporator 17 through a conduit 20. The liquid ammonia evaporates and diffuses into the hydrogen with consequent absorption of heat from the surroundings of the evaporator 17. The resulting rich gas mixture of ammonia and hydrogen flows from the evaporator 17 through an outer passage 21 of a gas heat exchanger 22 and vertical conduit 23 into the lower end of an air-cooled absorber 24 formed by a pipe coil having straight portions and connecting bends.

Ammonia is absorbed out of the enriched gas mixture into weak absorption liquid which enters the upper part of the absorber 24 from conduit 25. The hydrogen, which is practically insoluble and weak in ammonia, passes upward from the absorber 24 through a conduit 26, a plurality of parallel tubes 27 which form the inner passage of the gas heat exchanger 22, and conduit 20 into the upper end of the evaporator 17.

The absorption liquid in the absorber 24 becomes enriched in ammonia and passes through the lower end of conduit 23 into an accumulation vessel 28. From the vessel 28 the enriched absorption liquid flows through the inner passage of a liquid heat exchanger 29 to a coil 30, and is raised by vapor-lift action through conduit 31 into the upper part of the generator 10. The absorption liquid weak in ammonia flows from the lower part of the generator through a conduit 32, outer passage of the liquid heat exchanger 29 and conduit 25 into the upper end of absorber 24.

The lower end of the condenser 15 is connected by a conduit 33 to the gas circuit, as at the gas heat exchanger 22, for example, so that any non-condensible gas which may pass into the condenser can flow to the gas circuit and not be trapped in the condenser.

The continuous circulation of hydrogen in the gas circuit including the evaporator 17 and absorber 24 is due to the difference in specific weight of the rich mixture of hydrogen and vaporous refrigerant in the evaporator 17, outer passage 21 of the gas heat exchanger 22, and conduit 23; and the weak mixture of these gases in the absorber 24, conduit 26, inner passage 27 of the gas heat exchanger, and conduit 20. Due to the difference in specific weight of the rich and weak gas, therefore, a force is developed in the gas circuit for causing the flow of rich gas toward the absorber 24 and the flow of weak gas toward the evaporator 17.

The gas heat exchanger 22 transfers heat from weak gas flowing toward the evaporator 17 to rich gas flowing toward the absorber 24, and thereby reduces the amount of cooling of the weak gas that takes place in the evaporator. When the rate of flow of gas in the gas circuit is too great, the gas heat exchanger 22 becomes overloaded. In order to reduce the rate of flow of gas in the gas circuit when it is too great, baffles or inserts may be provided in the gas circuit. As shown in the drawing, inserts or baffles 34 may be provided at the upper end of conduit 23. If desired, the gas circuit may be narrowed or made smaller at any other suitable place, as in the gas heat exchanger 22 or other connecting conduits.

In accordance with my invention the absorber 24 is provided with a by-pass or short circuiting conduit 35 to cause a portion of the gas to flow several times through a portion of the absorber, whereby the latter will operate more efficiently to absorb vaporous refrigerant into absorption liquid. The conduit 35 is connected to a bend of the absorber 24 in such a manner that the gas flowing upward through the lower loop of the absorber, in counter-flow to absorption liquid, will divide at the juncture of conduit 35 and bend of the absorber. The gas diverted toward the left will continue to flow upward through the upper loops of the absorber and thence toward the evaporator 17, and the gas diverted toward the right will flow through conduit 35 and back into the conduit 23 to mix with enriched gas flowing toward the absorber from the evaporator 17. The conduit 35 is preferably shaped so that gas flows downward into conduit 23 from conduit 35 and in the same direction as the gas which is flowing downward from the upper end of conduit 23 to the lower end of the absorber.

Since the specific weight of the gas diverted into conduit 35 is less than that of the gas flowing downward in conduit 23, due to the absorption of ammonia vapor into absorption liquid in the lower loop of absorber 24, a force is developed to circulate gas in a local circuit including the lower loop of absorber 24, conduit 35 and the lower portion of conduit 23. This force for circulating gas in the local circuit is superimposed on the force developed in the gas circuit as a whole, whereby the rate of flow of gas in the local circuit is greater than in other parts of the gas circuit.

Due to the fact that gas flows several times through the lower loop of the absorber, the gas and liquid contact effected between ammonia vapor and absorption liquid is increased considerably, so that the hydrogen flowing upward through the upper loops of the absorber will contain a minimum amount of ammonia vapor. If desired, the by-pass conduit 35 may be provided with cooling fins 36 to increase the heat dissipating surface of the air-cooled absorber 24.

In order to obtain effective gas and liquid contact in the absorber, the latter is usually greater in size than the conduits connecting the absorber and the evaporator. Thus the increased rate of flow of gas through the local circuit including the lower loop of the absorber is effectively utilized to increase the rate of absorption of ammonia vapor into absorption liquid. At the same time the increased rate of gas flow through the lower part of the absorber does not affect the slower rate of gas flow through the gas heat exchanger 22, so that the latter will not become overloaded.

Although I have shown and described a preferred embodiment of my invention, I do not wish to be limited to the particular arrangements set forth, and I intend in the following claims to cover all modifications which do not depart from the spirit and scope of my invention.

What is claimed is:

1. Refrigeration apparatus including a generator, a condenser, an evaporator, an absorber, and members connecting the aforementioned parts to form a complete system for circulation of a refrigerant, an absorption liquid, and an inert gas, said apparatus being so constructed and arranged that a local circuit is provided to cause inert gas normally tending to flow through said absorber to recirculate through only a part of said absorber.

2. In an absorption refrigeration system, a gas heat exchanger, a storage vessel, a conduit extending vertically between said exchanger and said vessel, an absorber coil having one end connected to said conduit and one end connected to said exchanger for circulation of gas, a member for introducing absorption liquid into said coil, and means including a second conduit connecting said coil and said vertically extending conduit to provide a local circuit for causing gas to recirculate through at least a portion of said coil.

3. Absorption refrigerating apparatus including an evaporator, an absorber, means for conducting a cooling agent into said evaporator, means for conducting absorption liquid to said absorber, means for conducting absorption liquid from said absorber, means for conducting an auxiliary agent from said evaporator to said absorber, means for conducting auxiliary agent from said absorber to said evaporator, said cooling agent evaporating and diffusing into auxiliary agent in said evaporator, and means for diverting auxiliary agent from said absorber to said means through which auxiliary agent is conducted from said evaporator to said absorber to cause the auxiliary agent to flow a second time through only one part of said absorber.

4. Absorption refrigeration apparatus comprising a generator, a condenser, an absorber, an evaporator, and conduits connecting the aforementioned parts to provide a circuit for circulation of absorption liquid through and between said generator and said absorber, a circuit for circulation of refrigerant through said generator, condenser, evaporator and absorber, and a circuit for circulation of an auxiliary agent through and between said absorber and evaporator, and means for conducting the auxiliary agent away from an intermediate point in said absorber and again introducing such auxiliary agent into the absorber with the auxiliary agent flowing from said evaporator to said absorber.

5. Absorption refrigeration apparatus including an evaporator and an absorber, means for conducting cooling agent into said evaporator and from the latter into the absorption solution in said absorber, means for circulating an auxiliary agent between said absorber and said evaporator, and means associated with said absorber and said last-mentioned means for recirculating the auxiliary agent through only one part of said absorber before the auxiliary agent flows back to said evaporator.

6. In a method of refrigeration which includes flowing refrigerant vapor in the presence of an inert gas from a place of evaporation into intimate contact with absorption liquid at a place of absorption, and flowing the inert gas back to the place of evaporation, that improvement which consists in recirculating inert gas in intimate contact with absorption liquid in one part of said place of absorption before flowing to the other part of said place of absorption and thence back to the place of evaporation.

7. In a method of refrigeration which includes flowing refrigerant vapor in the presence of an inert gas from a place of evaporation into intimate contact with absorption liquid at a place of absorption, and flowing the inert gas back to the place of evaporation, that improvement which consists in causing the inert gas to flow at a faster rate through only one part of said place of absorption than the rate at which it flows through the other part of said place of absorption and said place of evaporation.

ALVAR LENNING.